(12) United States Patent
Sauer et al.

(10) Patent No.: US 11,085,639 B2
(45) Date of Patent: Aug. 10, 2021

(54) GAS TURBINE COMBUSTOR LINER WITH INTEGRAL CHUTE MADE BY ADDITIVE MANUFACTURING PROCESS

(71) Applicants: Rolls-Royce Corporation, Indianapolis, IN (US); Rolls-Royce North American Technologies Inc., Indianapolis, IN (US)

(72) Inventors: Kevin Sauer, Plainfield, IN (US); Christopher D. DeBruhl, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 287 days.

(21) Appl. No.: 16/234,016

(22) Filed: Dec. 27, 2018

(65) Prior Publication Data
US 2020/0208840 A1 Jul. 2, 2020

(51) Int. Cl.
*F23R 3/00* (2006.01)
*F23R 3/04* (2006.01)
*F23R 3/26* (2006.01)

(52) U.S. Cl.
CPC .............. *F23R 3/002* (2013.01); *F23R 3/007* (2013.01); *F23R 3/045* (2013.01); *F23R 3/26* (2013.01); *F23R 2900/03045* (2013.01)

(58) Field of Classification Search
CPC .... F23R 3/002; F23R 3/04; F23R 3/06; F23R 3/10; F23R 3/26; F23R 3/34; F23R 3/346; F23R 3/045; B33Y 80/00; B33Y 10/00; F05D 2230/31; F05D 2260/20; F05D 2240/35; B22F 3/1055
See application file for complete search history.

(56) References Cited

U.S. PATENT DOCUMENTS

| | | | | |
|---|---|---|---|---|
| 3,899,882 A * | 8/1975 | Parker | ...................... | F23R 3/045 60/752 |
| 4,132,066 A * | 1/1979 | Austin, Jr. | ................ | F23R 3/06 60/752 |
| 4,315,405 A * | 2/1982 | Pidcock | .................... | F23R 3/04 60/751 |
| 4,622,821 A * | 11/1986 | Madden | .................... | F23R 3/06 60/755 |
| 4,700,544 A * | 10/1987 | Fucci | ...................... | F23R 3/045 60/757 |
| 4,887,432 A * | 12/1989 | Mumford | .................. | F23R 3/06 60/759 |
| 6,170,266 B1 * | 1/2001 | Pidcock | .................... | F23R 3/06 60/755 |

(Continued)

*Primary Examiner* — William H Rodriguez
(74) *Attorney, Agent, or Firm* — Crowell & Moring

(57) ABSTRACT

Systems and methods are provided for a combustion liner assembly comprising at least a portion of a combustion liner of a combustor, the combustion liner defining a combustion chamber. A chute integral with at least the portion of the combustion liner is provided, the chute having an inlet, an outlet, and a body extending between the inlet and the outlet. The body of the chute extends towards a midline of the combustion chamber. The inlet is located in an outer surface of the combustion liner, and the outlet opens into the combustion chamber. A cooling channel is provided that extends from the outer surface of the combustion liner along the body of the chute.

16 Claims, 8 Drawing Sheets

(56) References Cited

U.S. PATENT DOCUMENTS

| | | | |
|---|---|---|---|
| 7,395,669 B2* | 7/2008 | Sherwood | F23R 3/04 |
| | | | 60/752 |
| 9,810,430 B2* | 11/2017 | Sandoval | F23R 3/02 |
| 10,443,848 B2* | 10/2019 | Cunha | F23R 3/06 |
| 10,612,781 B2* | 4/2020 | Cunha | F23R 3/50 |
| 2015/0362190 A1 | 12/2015 | Taylor et al. | |
| 2016/0209035 A1* | 7/2016 | Cramer | F23R 3/06 |
| 2016/0290643 A1* | 10/2016 | Cunha | F02C 7/24 |
| 2016/0290644 A1* | 10/2016 | Cunha | F02C 7/18 |
| 2016/0305325 A1* | 10/2016 | Cunha | F02C 7/18 |
| 2017/0045227 A1 | 2/2017 | Harding et al. | |
| 2017/0059159 A1 | 3/2017 | Varney | |
| 2017/0108220 A1* | 4/2017 | Kostka, Jr. | F23R 3/005 |
| 2018/0031238 A1 | 2/2018 | Harding | |
| 2018/0039254 A1* | 2/2018 | North | B33Y 10/00 |
| 2019/0226680 A1* | 7/2019 | North | F23R 3/286 |

* cited by examiner

GAS TURBINE COMBUSTOR LINER WITH INTEGRAL CHUTE MADE BY ADDITIVE MANUFACTURING PROCESS

TECHNICAL FIELD

This disclosure relates to combustor systems and, in particular, to combustion liner systems.

BACKGROUND

Present systems for chute cooling suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
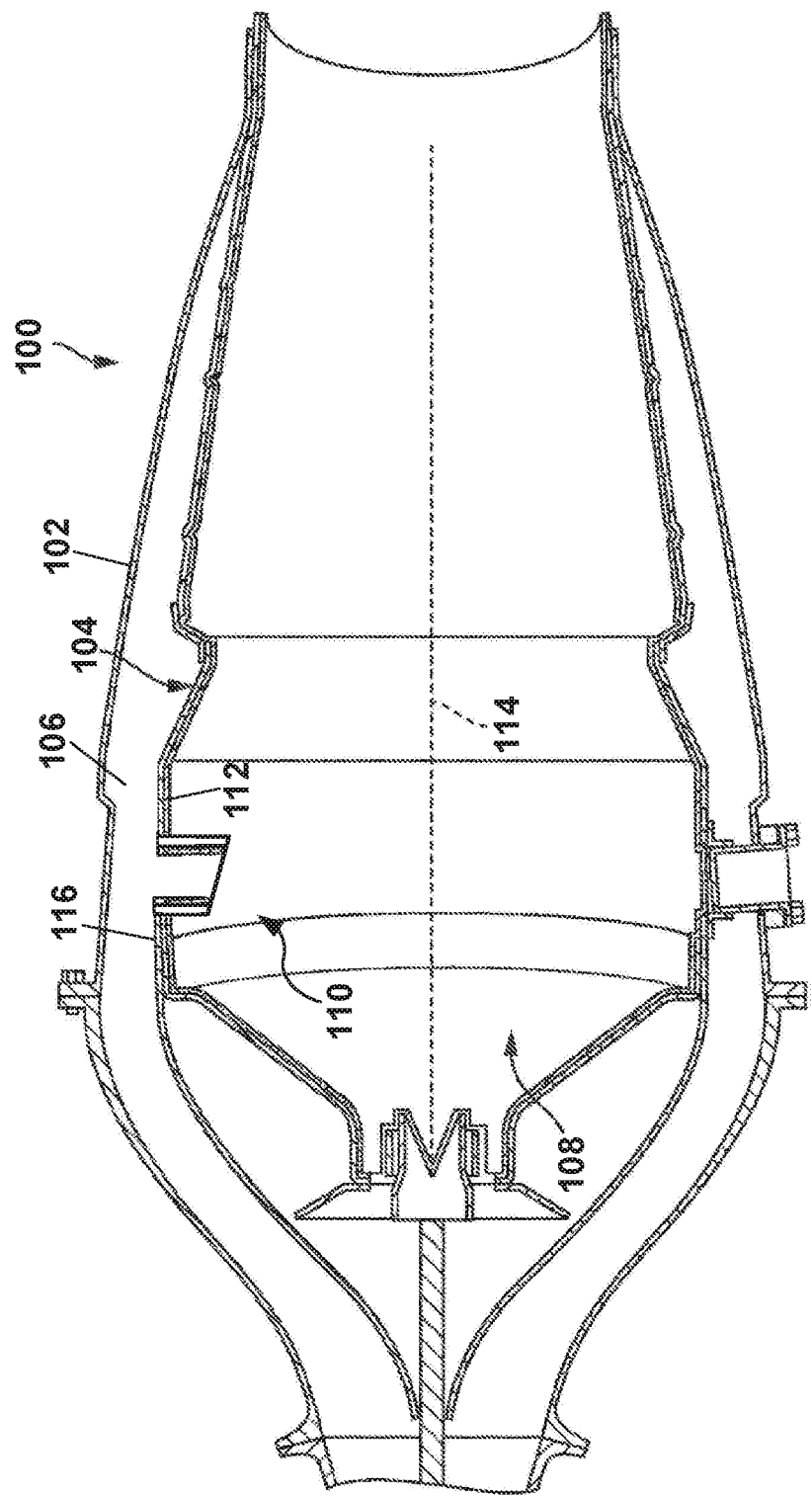
FIG. 1 illustrates a cross-sectional view of an example of a combustion assembly for a gas turbine engine.

One purpose of a combustion liner assembly is to direct mixing airflow into a combustor of a gas turbine engine. The combustion liner assembly typically includes chutes that extend down into the combustor to help direct the mixing airflow. Because the chutes extend into the combustor, the chutes are often exposed to extreme temperatures causing oxidation and material loss. Conventional chute cooling features such as slots or effusion holes are sometimes not effective, particularly for relatively long chutes or chutes with side-scarfing.

In one example, a combustion liner assembly for a gas turbine engine may be provided that includes at least a portion of a combustion liner of a combustor, the combustion liner defining a combustion chamber. The assembly further includes a chute integral with the at least the portion of the combustion liner. The chute has an inlet, an outlet, and a body extending between the inlet and the outlet. The body of the chute projects into the combustion chamber. The inlet is located on an outer liner surface of the at least the portion of the combustion liner, and the outlet opens into the combustion chamber. The assembly further includes a cooling channel that extends, for example, from the outer liner surface of the at least the portion of the combustion liner along a portion of the body of the chute that projects into the combustion chamber. A combustion liner assembly for a gas turbine engine, the combustion liner assembly comprising:

In another example, a combustion liner system is provided that includes at least a portion of a combustion liner defining a chamber of a combustor of a gas turbine engine. The system further includes a chute wall defining a chute. The chute wall may be integral with the at least the portion of the combustion liner and may project into the combustion chamber. The chute includes an inlet located on an outer surface of the at least the portion of the combustion liner and an outlet opening into the combustion chamber. The system further includes a channel wall extending along at least a portion of the chute wall that projects into the combustion chamber. The channel wall defines a cooling channel positioned between the chute wall and the channel wall, and the cooling channel extends along the chute.

In yet another example, a method for fabricating a combustion liner chute is provided. A chute wall and a channel wall are formed in at least a portion of a combustion liner of a combustor by additive layer manufacturing. During the additive layer manufacturing, a chute and a cooling channel are produced by adding layers of a material to a target surface. The chute may be formed to include an inlet, an oppositely disposed outlet, and a body extending between the inlet and the outlet. The chute may be formed to project into a combustion chamber of the combustor. The cooling channel is formed between the chute wall and the channel wall. The cooling channel may be formed to extend along the body of the chute.

Systems and methods are described herein that use a combustion liner assembly for increased cooling. The combustion liner assembly may be included in a combustor section of a gas turbine engine. The combustion liner assembly may be formed using additive layer manufacturing (ALM), which enables the creation of chute cooling features that could not be manufactured conventionally.

FIG. 1 illustrates a cross-sectional view of a combustor 100 for a gas turbine engine. In some examples, the gas turbine engine may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (hybrid-aircraft) vehicle. Alternatively or in addition, the gas turbine engine may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine may take a variety of forms in various embodiments. The gas turbine engine may be an axial flow engine. In some forms the gas turbine engine may have multiple spools and/or may be a centrifugal or mixed centrifugal/axial flow engine. In some forms, the gas turbine engine may be a turboprop, a turbofan, or a turboshaft engine. Furthermore, the gas turbine engine may be an adaptive cycle and/or variable cycle engine. Other variations are also contemplated.

The gas turbine engine may be an internal combustion engine that has an upstream rotating compressor coupled to a downstream turbine, and a combustor 100 in between. The combustor 100 may include, for example, a combustor shell 102, a combustion liner 104, an external cavity 106, a combustion chamber 108, and a combustion liner assembly 110. The external cavity 106 comprises an area between the combustor shell 102 and an outer liner surface 116, or cold side, of the combustion liner 104. The combustion chamber 108 comprises an area defined by an inner liner surface 112, or hot side, of the combustion liner 104. The combustion liner assembly 110 is integral with the combustion liner 104 and extends from the combustion liner 104 toward a midline 114 of the combustor 100. The midline 114 may be a line that passes through the center of the combustor 100 in an axial direction and spans the combustor 100.

The combustion liner 104 may be any liner suitable for use in a combustor section of a gas turbine engine. The combustion liner 104 may be any layer configured to contain combustion in a gas turbine engine. The combustion liner 104 may comprise a single piece in a single wall combustor. Alternatively, the combustion liner 104 may comprise multiple combustor tiles in a tiled combustor. In a tiled combustor, at least a portion of the combustion liner 104 may comprise one or more combustor tiles. In some examples, the combustion liner 104 may comprise multiple cooling holes for additional cooling. Alternatively or in addition, cooling air may be impinged on the outer liner surface 116. The combustion liner 104 may comprise, for example, a metal, a metal alloy, a superalloy, a ceramic matrix composite material (CMC), and/or any material capable of withstanding temperatures resulting from the combustion.

During operation of the combustor 100, as air passes through the external cavity 106 of the combustion liner 104, the combustion liner assembly 110 directs mixing air from the external cavity 106 into the combustion chamber 108. As a result of the combustion liner assembly 110 extending towards the midline 114 of the combustion chamber 108 and/or projecting into the combustion chamber 108 from the inner liner surface 112, the flow of the mixing air may approach the midline 114 of the combustion chamber 108 instead of merely flowing axially through the combustion chamber 108. Furthermore, the combustion liner assembly 110 may channel the mixing air toward the midline 114 allowing the mixing air to mix with fuel near the midline 114, resulting in more efficient combustion.

Figure 2:
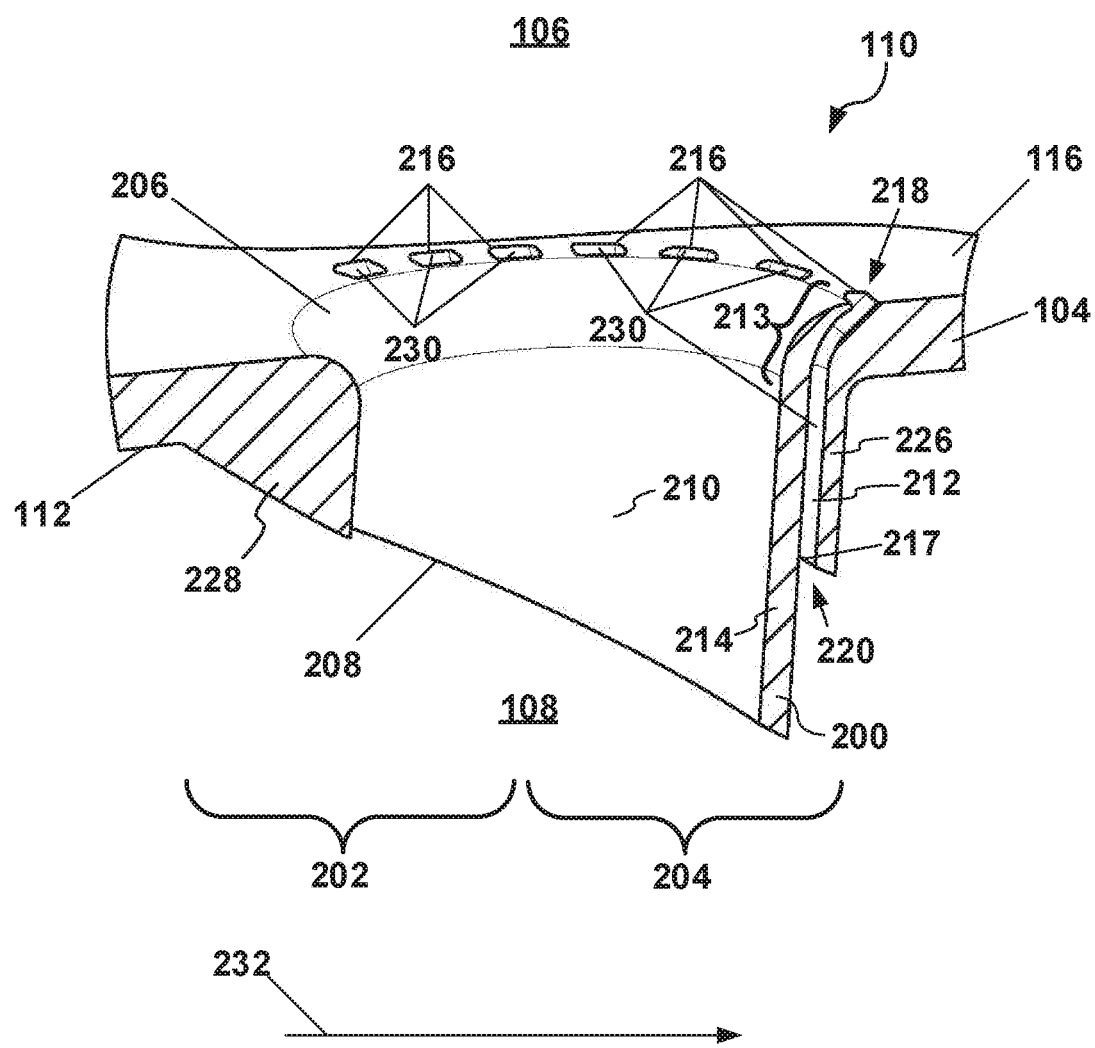
FIG. 2 illustrates a close-up cross-sectional view of an example of a combustion liner assembly.
Figure 3A:
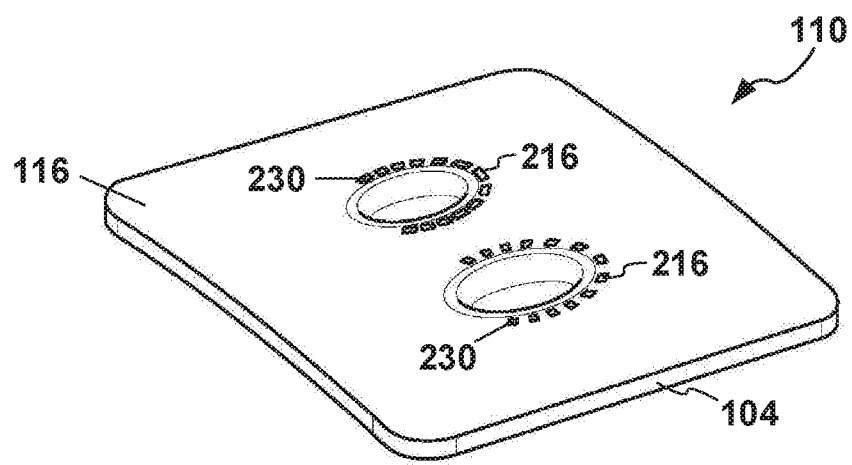
FIG. 3A illustrates a perspective view of an outer liner surface of the combustion liner assembly of FIG. 2.
Figure 3B:
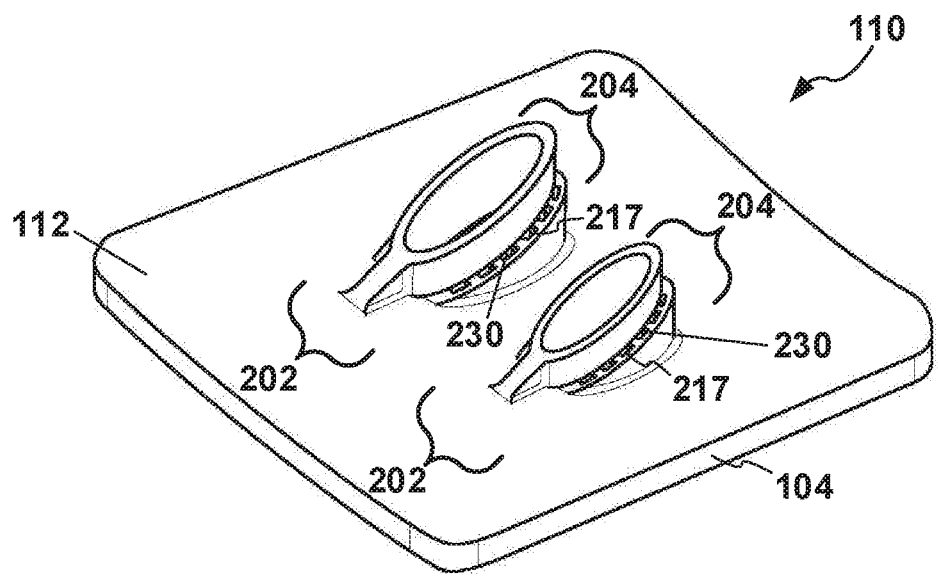
FIG. 3B illustrates a perspective view of an inner liner surface of the combustion liner assembly of FIG. 2.

FIGS. 2, 3A, 3B, illustrate different views of a first example of the combustion liner assembly 110. FIG. 2 is a close-up cross-sectional view of the first example of the combustion liner assembly 110. FIG. 3A is a perspective view of a portion of the first example of the combustion liner assembly 110 viewed from the external cavity 106. FIG. 3B is a perspective view of a portion of the first example of the combustion liner assembly 110 viewed from the combustion chamber 108. The combustion liner assembly 110 may include any assembly positionable in, or integral to, the combustion liner 104 and includes a chute 200. The combustion liner assembly 110 may include the chute 200 or multiple chutes, a cooling channel 212 or multiple cooling channels 212 positioned around and/or along at least a portion of the chute 200, and a ramp 228.

The combustion liner assembly 110 may be integrally formed in the combustion liner 104. In other words, the combustion liner assembly 110 and the combustion liner 104 may be one continuous piece. Alternatively, the combustion liner 104 and the combustion liner assembly 110 may be discrete pieces coupled together. In some examples, the combustion liner assembly 110 may include the combustion liner 104, the chutes 200, and the cooling channels 212 extending from the combustion liner 104 along the chutes 200. The combustion liner assembly 110 may comprise, for example, a metal, a metal alloy, a superalloy, a ceramic matrix composite material (CMC), and/or any material capable of withstanding temperatures resulting from the combustion.

The chute 200 may be any passage through which a cooling fluid, such as air, may pass and that projects into the combustion chamber 108. The chute 200 may be in a form of a tube that is open at both ends. Alternatively, the chute 200 may be in any other shape through which the passage may channel the cooling fluid. Referring to FIG. 2, the chute 200 may extend from the outer liner surface 116 of the combustion liner 104, through the combustion liner 104, toward the midline 114 of the combustion chamber 108. The chute 200 may include a chute wall 214 having an upstream portion 202 relative to a primary flow path 232 of the gas turbine engine and a downstream portion 204 relative to the primary flow path 232 of the gas turbine engine. The chute 200 may include a chute inlet 206, a chute outlet 208, and a passageway 210 extending between the chute inlet 206 and the chute outlet 208, the passageway 210 defined by the chute wall 214. The chute inlet 206 may define an opening in the combustion liner 104. In one example, the downstream portion 204 of the chute wall 214 may extend further towards the midline 114 of the combustion chamber 108 than the upstream portion 202 of the chute wall 214. In other words, the downstream portion 204 of the chute wall 214 may be longer than the upstream portion 202 of the chute wall 214. The chute inlet 206 may open into the external cavity 106 of the combustor 100, and the chute outlet 208 may open into the combustion chamber 108.

The cooling channel 212 may be any passageway, extending along at least a portion of the chute 200, through which cooling fluid, such as air, may pass. The cooling channel 212 may include a channel wall 226 positioned around at least a portion of the chute 200, a channel inlet 218, a channel outlet 220, and multiple discreet cooling channels 230 positioned between the chute wall 214 and the channel wall 226. The cooling channels 230 may extend along at least a portion of the chute 200 from the channel inlet 218 to the channel outlet 220. The channel wall 226 may be in a form of a cylindrical ring that encircles at least a portion of the chute 200. Alternatively, the channel wall 226 may be in any other shape suitable for forming the cooling channel 212. The cooling channel 212 may extend, for example, from the outer liner surface 116 of the combustion liner 104, through the combustion liner 104, toward the midline 114 of the combustion chamber 108. The channel inlet 218 may define an opening in the combustion liner 104.

As shown in FIGS. 2 and 3B, respectively, the channel inlet 218 may open into the external cavity 106, and the channel outlet 220 may open onto a surface of the chute wall 214 exposed to the combustion chamber 108. Alternatively or in addition, the channel outlet 220 may open into the combustion chamber 108. As shown in FIGS. 2 and 3A, the channel inlet 218 may include multiple channel inlet holes 216 formed in the outer liner surface 116 and arranged around at least a portion of a circumference of the chute 200. Not all of the channel inlet holes 216 shown in FIG. 3A are indicated with lead lines and reference numbers. As shown in FIG. 3B, the channel outlet 220 may include multiple channel outlet holes 217 arranged around at least a portion of the circumference of the chute 200. Not all of the channel outlet holes 217 shown in FIG. 3B are indicated with lead lines and reference numbers. In addition, not all of the cooling channels 230 shown in FIGS. 3A and 3B are indicated with lead lines and reference numbers. As shown in FIG. 2, at least a portion 213 of the cooling channel 212 may curve away from the chute inlet 206. In the first example, as shown in FIGS. 2 and 3B, the cooling channel 212 may extend along only a portion of the chute wall 214. In other examples, the cooling channel 212 may extend along an entire length of the chute wall 214.

The cooling channels 230 may be any passages through which cooling fluid, such as air, may pass. Each cooling channel 230 may be in a form of, for example, a cylindrical passageway that extends between one of the channel inlet holes 216 and one of the channel outlet holes 217. Alternatively, the cooling channels 230 may be in any other shape through which the cooling channels 230 may channel cooling fluid. As shown in FIG. 3A, the cooling channels 230 may be positioned around a portion of the circumference of the chute 200. In other examples, the cooling channels 230 may be positioned around the entire circumference of the chute 200. The cooling channels may extend along a portion of the chute wall 214. As shown in FIG. 3B, the cooling channels 230 in the downstream portion 204 may be shorter than the cooling channels 230 in the upstream portion 202. In other words, the cooling channels 230 positioned in the downstream portion 204 extend further into the combustion chamber 108 than the cooling channels 230 positioned in the upstream portion 202. In other examples, each of the cooling channels 230 may be substantially the same length. Each of the cooling channels 230 may curve away from the chute inlet 206.

The ramp 228 may be any sloped surface extending from the inner liner surface 112 toward a surface of the chute 200 and/or the cooling channel 212. In the first example, the ramp 228 may be added for support during an ALM manufacturing process and may be removed after the ALM manufacturing process is complete. In the first example, as shown in FIGS. 2 and 3B, the ramp may be positioned on the upstream portion 202 of the chute 200. Alternatively or in addition, the ramp may be positioned on the downstream portion 204 of the chute 200 and/or the cooling channel 212. In other examples, the combustion liner assembly 110 may not include the ramp 228.

During operation, the chute 200 may direct the mixing air from the external cavity 106 into the combustion chamber 108. Because the chute 200 projects into the combustion chamber 108, the chute 200 is exposed to high temperatures. In order to control the temperature of the chute 200, the cooling fluid flows from the external cavity 106 into the channel inlet holes 216. In some examples, because the channels inlet holes 216 are spaced apart from the chute inlet 206, the cooling fluid may be more likely to flow into the channel inlet holes 216 than if the channel inlet holes 216 were closer to the chute inlet 206. The cooling fluid is directed from the channel inlet holes 216, through the cooling channels 230, to the channel outlet holes 217. As the cooling fluid passes from the channel inlet holes 216 to the channel outlet holes 217, the cooling fluid may contact the surface of the chute wall 214, causing the chute 200 to cool.

Figure 4A:
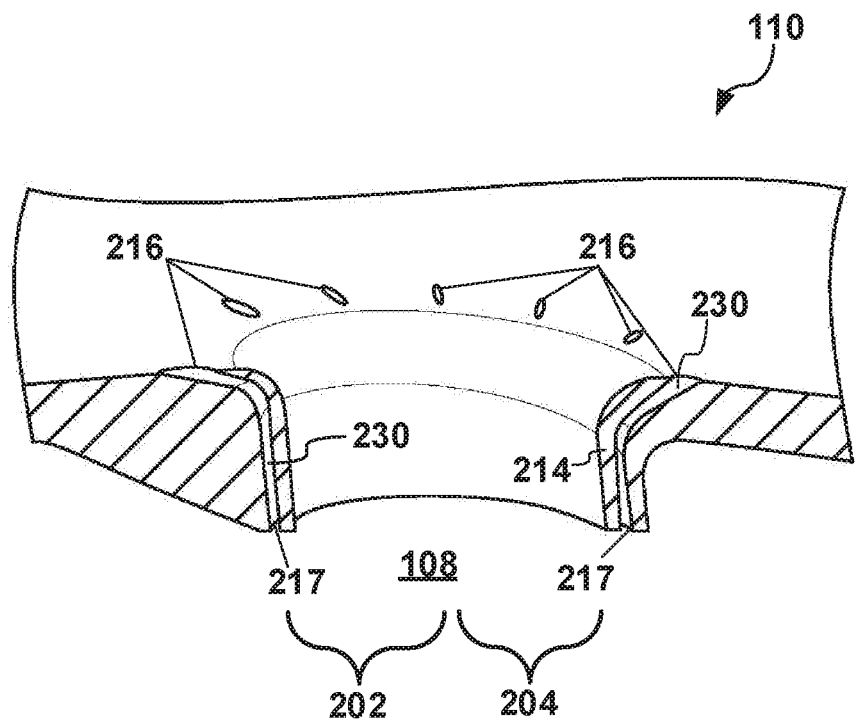
FIG. 4A illustrates a cross-sectional view of another example of the combustion liner assembly.
Figure 4B:
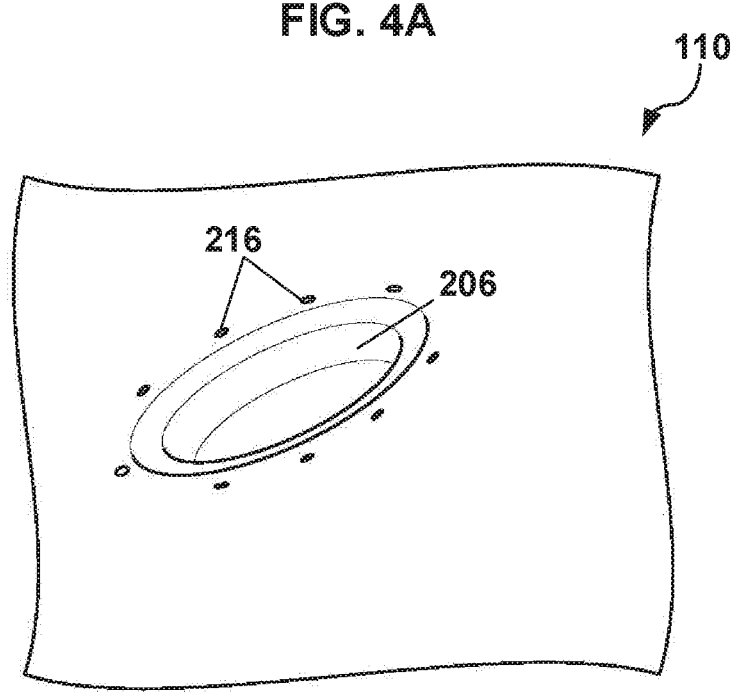
FIG. 4B illustrates a perspective view of the combustion liner assembly of FIG. 4A.

FIGS. 4A and 4B illustrate a second example of the combustion liner assembly 110. In the illustrated example, the cooling channels 230 are positioned in a circular pattern around an entire circumference of the chute 200. FIG. 4A is a cross-sectional perspective view of the combustion liner assembly 110. FIG. 4B is a perspective view of the combustion liner assembly 110 viewed from the external cavity 106. In this example, as shown in FIG. 4B, the channel inlet holes 216 may be positioned around the entire circumference of the chute inlet 206. Not all of the channel inlet holes 216 shown in FIG. 4B are indicated with lead lines and references numbers. The channel outlet holes 217 may be positioned around the entire circumference of the chute outlet 208. In this example, each of the cooling channels 230 are substantially the same length, such that the cooling channels 230 each extend a similar distance into the combustion chamber 108. In the example shown in FIG. 4A, the cooling channels 230 extend along the entire length of the chute wall 214.

Figure 5A:
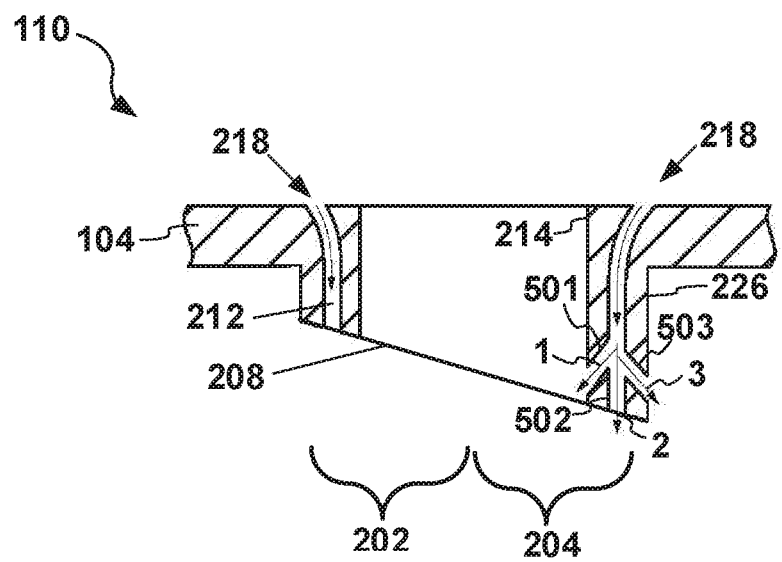
FIG. 5A illustrates a cross-sectional view of another example of the combustion liner assembly.

FIG. 5A illustrates an example of the combustion liner assembly 110 in which the cooling channel 212 includes multiple exit passages 501, 502, and 503. Each exit passage 501, 502, and 503 may direct the cooling fluid into a different direction than the other exit passages 501, 502, and 503. In the example shown in FIG. 5A, the cooling channel 212 includes a first exit passage 501, a second exit passage 502, and a third exit passage 503 located in the downstream portion 204. Alternatively or in addition, the exit passages 501, 502, and 503 may be located in the upstream portion 202. The first exit passage 501 may be positioned in the chute wall 214 and configured to direct the cooling fluid through the chute wall 214 and into the chute outlet 208 in a first cooling fluid path 1. The second exit passage 502 may be configured to direct the cooling fluid between the chute wall 214 and the channel wall 226 into the combustion chamber 108 in a second cooling path 2. The third exit passage 503 may be located in the channel wall 226 and may be configured to direct the cooling fluid through the channel wall 226 and away from the chute 200 in a third cooling path 3. During operation, the cooling fluid is directed from the cooling channel 212 to the first exit passage 501, the second exit passage 502, and/or the third exit passage 503.

Figure 5B:
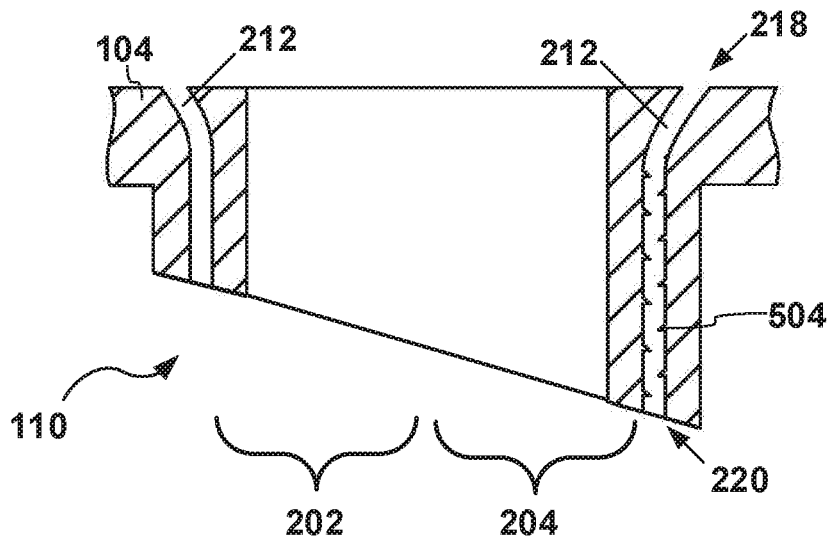
FIG. 5B illustrates a cross-sectional view of another example of the combustion liner assembly.

FIG. 5B illustrates an example of the combustion liner assembly 110 in which the cooling channel 212 includes turbulators 504. The turbulators 504 may be any pedestal, rib, or other feature configured to disrupt the flow of air through the cooling channel 212. As shown in FIG. 5B, the turbulators 504 may be positioned in the downstream portion 204. Alternatively or in addition, the turbulators 504 may be positioned in the upstream portion 202.

During operation, the cooling fluid is directed from the channel inlet 218, through the cooling channel 212, to the channel outlet 220. As the cooling fluid passes through the cooling channel 212, the cooling fluid contacts the turbulators 504, causing turbulence in the cooling fluid flowing in the cooling channel 212, which may increase the cooling effectiveness of the cooling fluid.

Figure 6:
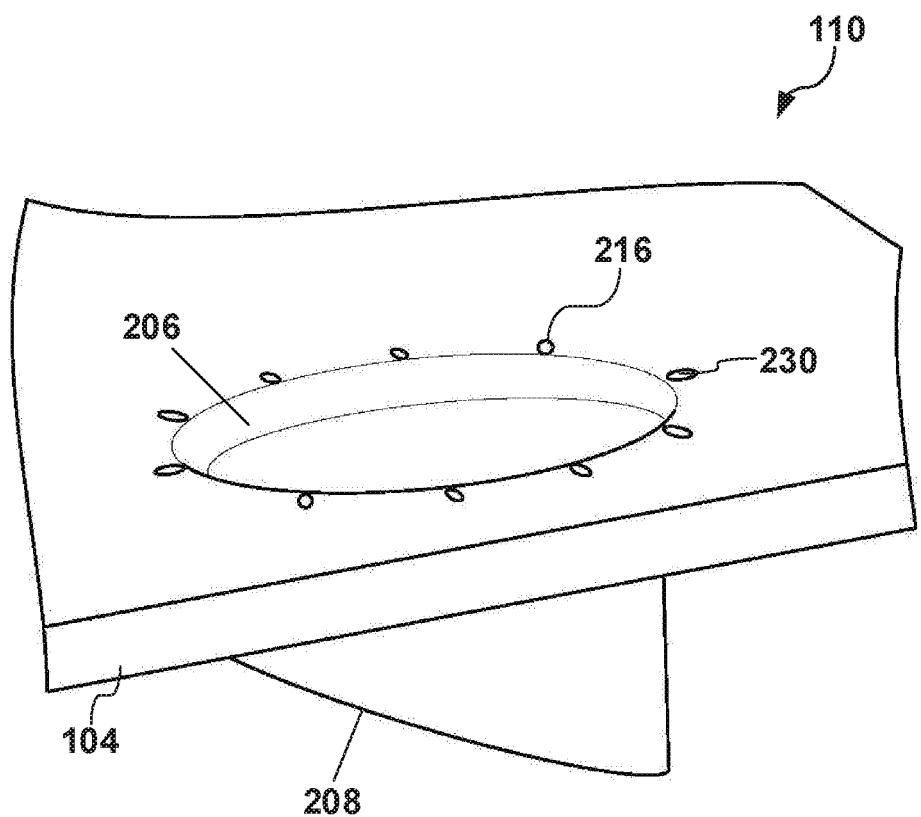
FIG. 6 illustrates another example of the combustion liner assembly.
Figure 7A:
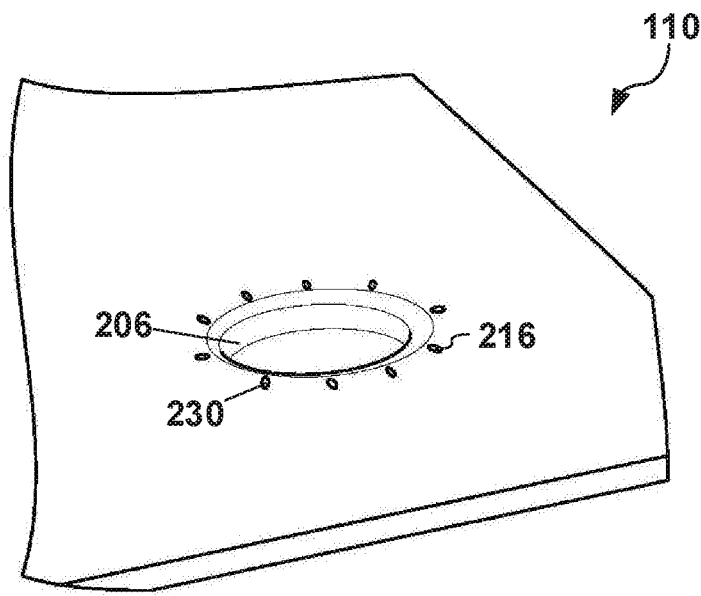
FIG. 7A illustrates a perspective view of the outer liner surface of the combustion liner assembly of FIG. 6.
Figure 7B:
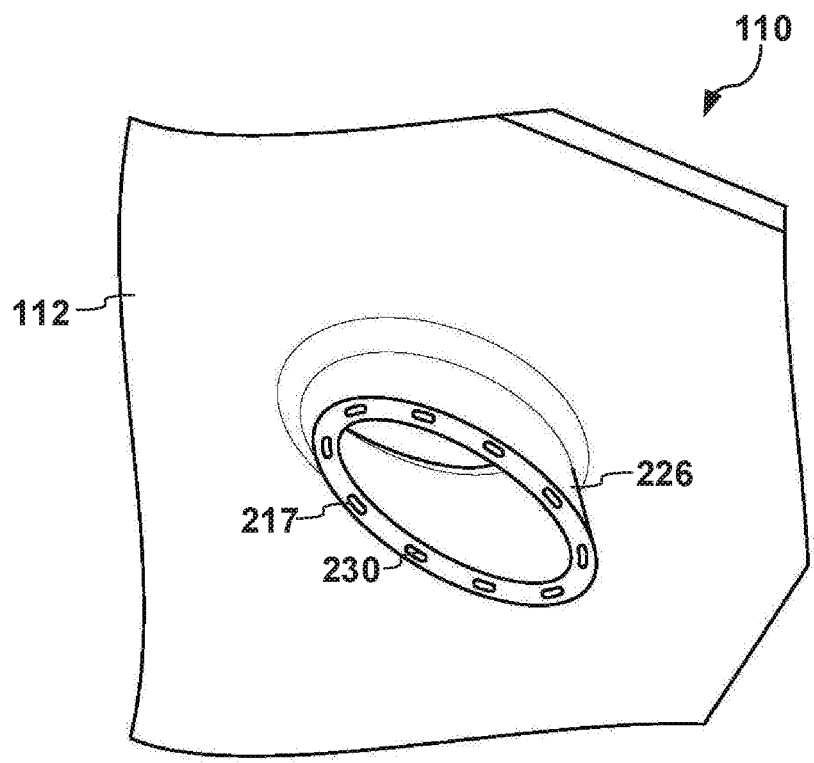
FIG. 7B illustrates a perspective view of the inner liner surface of the combustion liner assembly of FIG. 6.
Figure 8:
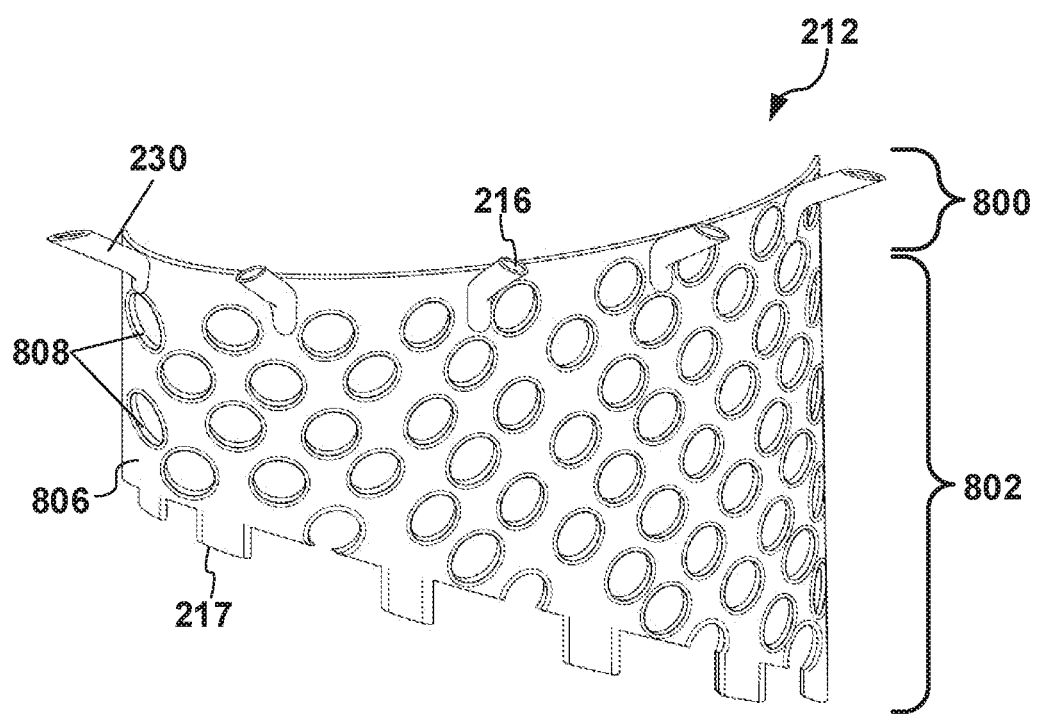
FIG. 8 illustrates a perspective view of a cross-section of a cooling channel within the combustion liner assembly of FIG. 6.

FIG. 6, 7A, 7B, and 8 illustrate an example of the combustion liner assembly 110 in which the cooling channel 212 includes pedestals 808, which are only visible in FIG. 8. FIG. 6 is a perspective view of a portion of the combustion liner assembly 110 viewed from a side of the combustion liner 104. FIG. 7A is a perspective view of a portion of the combustion liner assembly 110 viewed from the external cavity 106, and FIG. 7B is a perspective view of a portion of the combustion liner assembly 110 viewed from the combustion chamber 108. FIG. 8 is a perspective view of a cross-section of the cooling channel 212, which is inside of the example of the combustion liner assembly 110 shown in FIGS. 6, 7A, and 7B. The cooling channel 212 is largely hidden from view in FIGS. 6, 7A, and 7B. In this example, a first portion 800 of the cooling channel 212 is integral with a second portion 802, as shown in FIG. 8. Alternatively, the first portion 800 may be coupled to the second portion 802.

The first portion 800 of the cooling channel 212 may be any portion of the cooling channel 212 configured to guide cooling air into the second portion 802 of the cooling channel 212. The first portion 800 of the cooling channel 212 may include the cooling channels 230 positioned in a circular pattern around the chute inlet 206. Referring to FIGS. 6, 7A, 7B, and 8, not all of the cooling channels 230, the channel inlet holes 216, and the channel outlet holes 217 shown are indicated with lead lines and reference numbers. As shown in FIG. 8, the cooling channels 230 may curve away from the chute inlet 206. The cooling channels 230 may extend from the channel inlet holes 216 to the second portion 802 of the cooling channel 212.

The second portion 802 of the cooling channel 212 may be any portion configured to receive cooling fluid from the first portion 800 of the cooling channel 212 and to guide cooling fluid along a portion of the chute 200 towards the midline 114 of the combustion chamber 108 or otherwise projecting into the combustion chamber 108. The second portion 802 may include the channel outlet holes 217, a channel body 806 extending between the first portion 800 and the channel outlet holes 217, and multiple pedestals 808 located in the channel body 806. Not all of the pedestals 808 shown in FIG. 8 are indicated with lead lines and reference numbers. The channel body 806 may be any cylindrical passageway through which cooling air may flow. The channel body 806 may be a cylindrical in shape. In other examples, the channel body 806 may be any other shape configured to guide cooling fluid.

The pedestals 808 may be any projection formed in the channel body 806 and configured to obstruct and guide the cooling fluid as the cooling fluid passes through the cooling channel 212. As shown in FIG. 8, the pedestals 808 may be ring shaped. In other examples, the pedestals 808 may be any other shape configured to guide the cooling fluid.

During operation, cooling fluid may enter the cooling channel 212 via channel inlet holes 216. The cooling fluid is guided through the cooling channels 230 of the first portion 800 to the channel body 806 of the second portion 802. The cooling fluid may be guided around the pedestals 808, through the channel body 806, to the channel outlet holes 217. As the cooling fluid is guided through the cooling channels 230 and around the pedestals 808, the cooling fluid contacts the chute wall 214, cooling the chute wall 214.

The combustion liner system may include only the combustion liner assembly 110. Alternatively or in addition, the combustion liner system may include the combustion liner 104. The system may include the chute wall 214 integrally located in the combustion liner 104. The chute wall may define the chute 200 having the chute inlet 206 and the chute outlet 208. The system may further include the channel wall 226 integrally located in the combustion liner 104 and positioned around at least a portion of the circumference of the chute 200. The channel wall 226 may define a cooling channel 212 located between the chute wall 214 and the channel wall 226. In other examples, the system may be implemented with additional, different, or fewer components.

Each component may include additional, different, or fewer components. For example, the combustion liner assembly 110 may include the chute 200 and the cooling channels 212 positioned along at least a portion of the chute 200, but not the ramp 228. In another example, the combustion liner assembly 110 may include the chute 200 and only the cooling channel 212 without the cooling channels 230. In such an example, the cooling channel 212 may comprise one continuous channel wrapping around at least a portion of the chute 200. Alternatively or in addition, the channel inlet 218 may not include the channel inlet holes 216. Instead, the channel inlet 218 may comprise a continuous curved hole that extends at least partially around the circumference of the chute inlet 206. Alternatively or in addition, the channel outlet 220 may not include the channel outlet holes 217. Instead, the channel outlet may comprise a continuous curved hole that extends at least partially around the chute 200. In yet another example, a diameter of the cooling channels 230 may be uniform from the channel inlet holes 216 to the channel outlet holes 217. Alternatively, the diameter of the cooling channels 230 may vary from the channel outlet inlet holes 216 to the channel outlet holes 217. For example, a diameter of the channel outlet holes 217 may be larger than a diameter of the channel inlet holes 216.

In some examples, additive layer manufacturing (ALM) may be implemented to produce the combustion liner assembly 110. ALM may be any manufacturing process that builds 3D parts in a series of successive layers of a material. For example, ALM may include 3D-printing. The material may comprise a metal, a metal alloy, a superalloy, a ceramic matrix composite material (CMC), and/or any material capable of withstanding temperatures resulting from the combustion. In some examples, two or more of the features of the combustion liner assembly 110 may be produced individually by ALM and then coupled together. In another example, the combustion liner assembly may be produced as a single continuous piece.

An example of ALM may include electron beam melting. In this example, the combustion liner assembly 110 may be produced by sequential selective melting of thin powder layers of the material. For example, a layer of powder is deposited onto a surface, or plate, and an energy source, such as an electron beam, is used to selectively melt the powder layer. The melted material then solidifies to produce a solid layer of the desired shape. Further powder layers are added, melted, and solidified until a final desired 3D geometry of the combustion liner assembly 110 has been produced. Another example of ALM may include laser powder bed fusion. The laser powder bed fusion comprises a process similar to electron beam melting but includes a laser energy source instead of the electron beam.

ALM may operate directly from a 3D CAD model of the combustion liner assembly, and may not require any specific tooling to produce components of the combustion liner assembly 110 or the combustion liner assembly 110 as a single piece.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

What is claimed is:

1. A combustion liner assembly for a gas turbine engine, the combustion liner assembly comprising:
   at least a portion of a combustion liner of a combustor, the combustion liner defining a combustion chamber;
   a chute integral with the at least the portion of the combustion liner, the chute having an inlet, an outlet, and a body extending between the inlet and the outlet, wherein the body of the chute projects into the combustion chamber, wherein the inlet is located on an outer surface of the at least the portion of the combustion liner and the outlet opens into the combustion chamber; and
   a cooling channel extending from the outer surface of the at least the portion of the combustion liner along a portion of the body of the chute that projects into the combustion chamber,
   wherein the cooling channel comprises a plurality of cooling channels, each of the cooling channels having a channel inlet hole at one end and a channel outlet hole at an oppositely disposed end, and
   wherein the channel outlet hole of one of the cooling channels is split into three exit passages.

2. The combustion liner assembly of claim 1, wherein a diameter of each of the cooling channels increases from the channel inlet hole to the channel outlet hole.

3. The combustion liner assembly of claim 1, wherein the cooling channel curves away from the inlet of the chute.

4. The combustion liner assembly of claim 1, wherein the at least the portion of the combustion liner and the chute comprise a metal alloy.

5. The combustion liner assembly of claim 1, wherein the at least the portion of the combustion liner comprises a combustor tile.

6. A combustion liner system comprising:
   at least a portion of a combustion liner defining a combustion chamber of a combustor of a gas turbine engine;
   a chute wall defining a chute, wherein the chute wall is integral with the at least the portion of the combustion liner and projects into the combustion chamber, the chute comprising an inlet located on an outer surface of the at least the portion of the combustion liner and an outlet opening into the combustion chamber; and
   a channel wall extending along at least a portion of the chute wall that projects into the combustion chamber, the channel wall defining a plurality of cooling channels positioned between the chute wall and the channel wall, wherein each of the plurality of cooling channels extends along the chute from a channel inlet hole to a channel outlet hole,
   wherein the channel outlet hole of one of the plurality of cooling channels splits into three exit passages.

7. The system of claim 6, wherein the plurality of cooling channels comprises a first portion and an oppositely disposed second portion, wherein the first portion is in fluid communication with the second portion.

8. The system of claim 7, wherein the plurality of cooling channels is arranged around a circumference of the chute, and wherein the plurality of cooling channels curves away from the inlet.

9. The system of claim 8, wherein the second portion comprises a channel body comprising pedestals.

10. The system of claim 6, wherein the chute further comprises an upstream side relative to a primary flow path of the gas turbine engine, and a downstream side relative to the primary flow path, and wherein the downstream side of the chute extends further into the combustion chamber than the upstream side of the chute.

11. A method for fabricating a combustion liner chute, the method comprising:
    forming a chute wall and a channel wall in at least a portion of a combustion liner of a combustor by additive layer manufacturing, the additive layer manufacturing comprising producing a chute and a plurality of cooling channels by adding layers of a material to a target surface, wherein the chute has an inlet, an oppositely disposed outlet, and an body extending between the inlet and the outlet, wherein the chute projects into a combustion chamber of the combustor, and
    wherein the plurality of cooling channels is between the chute wall and the channel wall, and wherein each of the plurality of cooling channels extends along the body of the chute from a channel inlet hole to a channel outlet hole,
    wherein the channel outlet hole of one of the plurality of cooling channel splits into three exit passages.

12. The method of claim 11, the method further comprising producing turbulators in the cooling channel.

13. The method of claim 11, wherein the plurality of cooling channels diverges at the outlet.

14. The method of claim 11, wherein the additive layer manufacturing comprises electron beam melting.

15. The method of claim 11, wherein the additive layer manufacturing comprises laser powder bed fusion.

16. The method of claim 11, the method further comprising producing the combustion liner, the chute, and the plurality of cooling channels as one continuous piece by additive layer manufacturing.

* * * * *